(12) United States Patent
Syeda-Mahmood

(10) Patent No.: US 6,578,040 B1
(45) Date of Patent: Jun. 10, 2003

(54) METHOD AND APPARATUS FOR INDEXING OF TOPICS USING FOILS

(75) Inventor: Tanveer Fathima Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 09/593,207

(22) Filed: Jun. 14, 2000

(51) Int. Cl.$^7$ .............................................. G06F 17/30
(52) U.S. Cl. ...................................................... 707/102
(58) Field of Search ........................................ 707/102

(56) References Cited

U.S. PATENT DOCUMENTS

| | | | | |
|---|---|---|---|---|
| 4,660,107 A | * | 4/1987 | Chippendale, Jr. ........... | 360/25 |
| 5,884,014 A | * | 3/1999 | Huttenlocher et al. ...... | 358/1.15 |
| 6,021,412 A | * | 2/2000 | Ho et al. .................. | 707/104.1 |
| 6,044,365 A | * | 3/2000 | Cannon et al. ................ | 707/2 |
| 6,195,093 B1 | * | 2/2001 | Nelson et al. ............... | 345/732 |
| 6,249,281 B1 | * | 6/2001 | Chen et al. .................. | 345/753 |
| 6,342,904 B1 | * | 1/2002 | Vasudevan et al. ......... | 345/723 |
| 6,353,450 B1 | * | 3/2002 | DeLeeuw .................... | 345/768 |
| 6,369,835 B1 | * | 4/2002 | Lin .............................. | 345/726 |
| 6,397,213 B1 | * | 5/2002 | Cullen et al. .................. | 707/5 |
| 6,404,925 B1 | * | 6/2002 | Foote et al. ................. | 382/224 |

OTHER PUBLICATIONS

"Locating Indexing Structures in Engineering Drawing Databases using Location Hashing", Tanveer Syeda–Mahmood, INBM Almaden Research Center, 1999 IEEE, pp. 49–55.

"Passive Capture and Structuring of Lectures", Sugata Mukhopadhyay, Brian Smith, Department of Computer Science Cornell University, pp. 477–487, 1999.

"A Maximum Likelihood Model For Topic Classification Of Broadcast News", Richard Schwartz, Toru Imai, Francis Kubala, Long Nguyen, John Makhoul, BBN Systems and Technologies, 5 pages, 1997.

"Combining Color and Geometric Information for the Illumination Invariant Recognition of 3–D Objects", David Slater and Glenn Healey, Department of Electrical and Computer Engineering University of California, 1995 IEEE, pp. 563–568.

"The Combinatories of Object Recognition in Cluttered Environments using Constrained Search", W. Eric L. Grimson, Artificial Intelligence Laboratory and Department of Electrical Engineering and Computer Science Massachusetts Institute of Technology, 1988 IEEE, pp. 218–249.

"Topic–Based Browsing Within a Digital Library Using Keyphrases", Steve Jones and Gordon Paynter, Department of Computer Science The University of Waikato, pp. 114–121, 1999.

"Topic Labeling of Multilingual Broadcast News in the Information Digital Video Library", Alexander G. Hauptmann, F Danny Lee and Paul E. Kennedy, Sample EACL 1999 Submission, 6 pages.

(List continued on next page.)

Primary Examiner—Wayne Amsbury
(74) Attorney, Agent, or Firm—McGinn & Gibb, PLLC; Alison Mortinger, Esq.

(57) ABSTRACT

A method and structure for indexing multi-media data comprising deriving keywords from a first media type (slides), matching the keywords to a second media type (video), identifying an appearance of the first media type in the second media type, and calculating a co-occurrence of the keywords and the appearance of the first media type in the second media type. The invention produces an index of the second media type based on the co-occurrence.

28 Claims, 5 Drawing Sheets

OTHER PUBLICATIONS

"Color Constant Color Indexing", IEEE Transactions on Pattern Analysis and Machine Intelligence, vol. 17, No. 5, May 1995, pp. 522–529.

"Improved Algorithms for Topic Distillation in a Hyperlinked Enviornment", Krishna Bharay amd Monika R. Henzinger, Digital Equiptment Corporation Systems Research Center, pp. 104–111, 1999.

"CueVideo: Automated video/audio indexing and browsing", Arnon Amir, Savithja Srinivasan, Dulce Ponceleon and Dragutin Petkovic, IBM Almaden Research Center, pp. 326–327, 1999.

"Teaching and Learning as Multimedia Authoring: The Classroom 2000 Project", Gregory D. Abowd, Christopher G. Atkeson, Ami Feinstein, Cindy Hmelo, Rob Kooper, Sue Long, Nitin "Nick" Sawhney and Mikiya Tani, pp. 1–12, 1996.

* cited by examiner

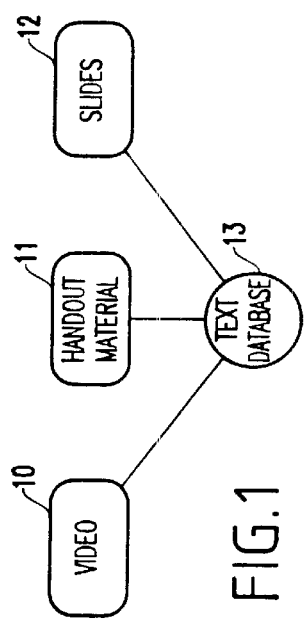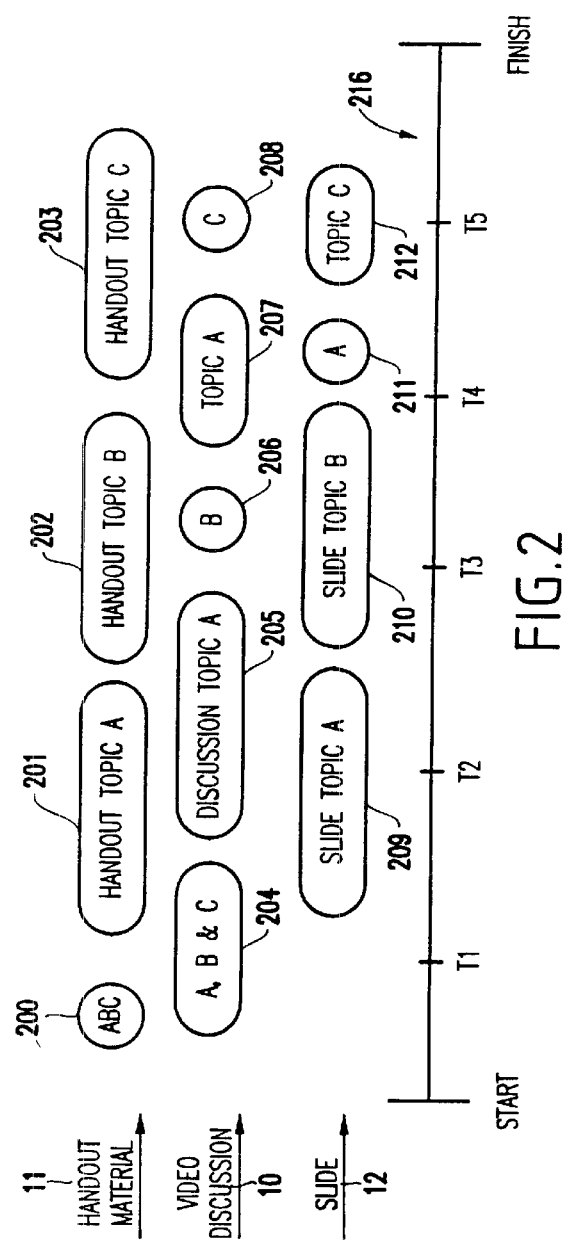

METHOD AND APPARATUS FOR INDEXING OF TOPICS USING FOILS

CROSS-REFERENCE TO RELATED APPLICATIONS

This application is related to co-pending applications Ser. Nos. 09/593,205 and 09/593,465 both filed Jun. 14, 2000 and both now pending, and Ser. No. 09/593,206 filed Jun. 14, 2000, now U.S. Pat. No. 6,507,838.

BACKGROUND OF THE INVENTION

1. Field of the Invention

The present invention generally relates to systems that search and index different modes of media (audio, text, video, etc.) based upon a query and more particularly to an improved system that indexes one form of media using keywords from another form of media using a relevance-based time overlap between the matches in the different media modes.

2. Description of the Related Art

Information can be stored in many different forms (modes). Before the advent of audio recordings, the only form to record information was the written word, written symbols, and/or numbers. Subsequently, audio and video recordings were used to supplement or replace written information. Regardless of the mode in which information is recorded, there is always a need to search and index the information so that only relevant portions need to be reviewed when the user has a question (query) on a very specific topic.

Conventional searches primarily involve keyword queries of previously created text or indexes. Thus, it is common to perform a simple Boolean combination such as AND/OR, or perform a search based on individual relevance scores of the textural data. However, with the increasing use of different media modes to record information, there is a need to logically search video, audio, and graphics, as well as textual information.

Detecting and recognizing slides or transparencies used by a speaker in a video is important for detecting teaching-related events in video. This is particularly important in the domain of distributed or distance learning whose long-standing goal has been to provide a quality of learning comparable to the face-to-face environment of a traditional classroom for teaching or training. Effective preparation of online multimedia courses or training material for users is currently ridden with problems including the high cost of manual indexing, slow turnaround, and inconsistencies from human interpretation. Automatic methods of cross-linking and indexing multimedia information are very desirable in such applications, as they can provide an ability to respond to higher level semantic queries, such as for the retrieval of learning material relating to a topic of discussion.

Automatic cross-linking multimedia information, however, is a non-trivial problem as it requires the detection and identification of events whose common threads appear in multiple information modalities. An example of such events include points in a video where a topic was discussed. From a survey of the distance learning community, it has been found that the single most useful query found by students is the querying of topic of interest in a long recorded video of a course lecture. Such classroom lectures and talks are often accompanied by foils (also called slides), some of which convey the topic being discussed at that point in time. When such lectures are video taped, at least one of the cameras can be used to capture the displayed slide, so that the visual appearance of a slide in video can be a good indication of the beginning of a discussion relating to a topic.

The recognition of slides in the video, however, is a challenging problem for several reasons. First, the imaging scenario in which a lecture or talk was taped could be of a variety of forms. There could be a single camera looking at the speaker, the screen showing the slide, and the audience. Also, the camera often zooms or pans. Alternately, a single camera could be dedicated to looking at the screen, or the overhead projector where the transparency is being displayed, while another camera looks at the speaker. The final video in this case, may have been edited to merge the two video streams.

Thus, the slide appearing in a video stream could consume an entire video frame or be a region in a video frame. Secondly, depending on the distance between the camera and the projected slide, the scale at which the slide image appears in the video could be reduced, making it difficult to read the text or slide and/or make it hard to detect text using conventional text recognition methods. Additionally, the color on the slides undergoes transformation due to projection geometry, lighting conditions of the scene, noise in the video capture and MPEG conversion. Finally, the slide image often appears occluded and/or skewed. For example, the slide image may be only partially visible because another object (e.g., person giving the talk) is covering or blocking the slide image.

Previous approaches of slide detection have worked on the premise that the camera is focused on the slides, so that a simple change detection through frame subtraction can be used to detect changes in slides. There has been some work done in the multimedia authoring community to address this problem from the point of synchronization of foils with video. The predominant approach has been to do on-line synchronization using a structured note-taking environment to record the times of change of slide electronically and synchronize with the video stream.

Current presentation environments such as Lotus Freelance or Powerpoint have features that can also record the change time of slides when performed in rehearse modes. In distributed learning, however, there is often a need for off-line synchronization of slides since they are often provided by the teacher after a video recording of the lecture has been made.

The detection of foils in a video stream under these settings can be challenging. A solution to this problem has been proposed for a two-camera geometry, in which one of the cameras was fixed on the screen depicting the slide. Since this was a more-or-less calibrated setting, the boundary of the slide was visible so that the task of selecting a slide-containing region in a video frame was made easy. Further, corners of the visible quadrilateral structure could be used to solve for the 'pose' of the slide under the general projective transform.

Therefore, there is a need for a system which can recognize slides, regardless of whether the slides are distorted, blurred, or partially blocked. A system and process for "recognizing" slides and indexing the video using such information has not been explored before. The inventive approach to foil detection is meant to consider more general imaging situations involving one or more cameras, and greater variations in scale, pose and occlusions.

Other related art includes the principle of geometric hashing and its variants[Lamdan & Wolfson, Proc. Int. Conf.

Computer Vision,(ICCV) 1988, Rigoustous and Wolfson, Spl. Issue on geometric hashing, IEEE Computational Science and Engg., 1997, Wolfson, "On curve matching" in IEEE Transactions Pattern Analysis and Machine Intelligence, vol. 12, pp.483–489, 1990, incorporated herein by reference], that has been applied earlier to the problem of model indexing in computer vision, and the related technique of location hashing that has also been disclosed earlier [Syeda-Mahmood, Proc. Intl. Conf. Computer Vision and Pattern Recognition, CVPR 1999, incorporated herein by reference].

SUMMARY OF THE INVENTION

It is, therefore, an object of the present invention to provide a structure and method for indexing multi-media data comprising deriving keywords from a first media type (slides), matching the keywords to a second media type (video), identifying an appearance of the first media type in the second media type, and calculating a co-occurrence of the keywords and the appearance of the first media type in the second media type. The invention produces an index of the second media type based on the co-occurrence.

The identifying of the appearance of the first media type in the second media type includes generating keyframes from the second media type, extracting geometric keyframe features from the keyframes and geometric slide features from the first media type and matching the geometric slide features and the geometric keyframe features.

The invention further identifies background matching regions in the keyframes having colors matching colors of backgrounds in the second media type. The extracting of the geometric keyframe features is performed only in the background matching regions. The matching identifies which portion of the first media type has a highest number of geometric slide features matching geometric keyframe features in a keyframe.

The extracting process includes identifying changes in image intensity as edges, forming curves connecting the edges, identifying comers where the curves change direction, grouping the curves into curve-groups, and designating a sequence of three consecutive features in each of the curve-groups as basis triples. The matching process comprises computing coordinates of the basis triples, and identifying which portion of the first media type has a highest number of basis triples matching basis triples in a keyframe. Generating the keyframes comprises dividing the second media type into portions based upon scene changes and selecting one frame from each portion of the second media type as a keyframe. The calculating process comprises processing the multi-media data to extract relevance scores and time reference points of matches to individual media modes, identifying overlapping time periods of matching keywords and the appearance of the first media type in the second media type, and ranking the relevance of the overlapping time periods. The ranking can include finding an overlapping time period having a highest relevance score, segmenting the overlapping time period to identify beginning and ending events, and finding the largest number of different modes of overlap. Such modes can comprise audio, video, text, and graphic display.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a schematic diagram of various multi-media sources connected to a database;

FIG. 2 is a schematic diagram of a time line illustrating the occurrence of different topics within the different media modes shown in FIG. 1;

DETAILED DESCRIPTION OF PREFERRED EMBODIMENTS OF THE INVENTION

Figure 4:
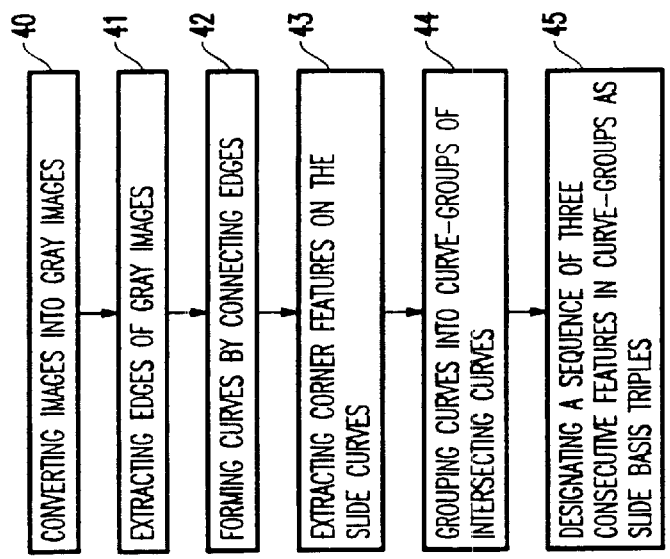
FIG. 4 is a flow chart of the steps involved in extracting the geometric slide features.

The invention is directed toward combining searches using multi-modal queries on multi-media data to index the various media sources. More specifically, the invention automatically indexes the information contained within one media source, based upon keywords from a different media source. For example, in one simplified embodiment, the invention determines keywords from captions on foils and produces an index for a related video based upon the co-occurrence of the foils in the video and keywords in the audio portion of the video. Since, the invention automatically finds the keywords from the foils and automatically produces the index of the video, without any manual contributions, the invention is extremely efficient and more consistent than manual indexing.

As discussed above, current methods of combining searches involve a simple Boolean combination such as AND/OR or operate based on the relevance scores of the individual modal matches. The invention goes well beyond conventional methods and takes into account an important aspect of multimedia content, namely, a relevance-based time co-occurrence of events.

Multimedia data such as learning material associated with an educational course can have multiple forms of data associated with it. Such data can be in the form of text derived from multiple sources, such as text books, scripts (for scripted presentations e.g., CEO communiques), text content within slides or overhead used during presentation, or speech converted to text from an analysis of the audio tract. Multimedia data also consists of audio information derived from the audio tract as well as visual information in the form of associated images. Finally, a video taping of the presentation/course can also be provided.

Referring now to FIG. 1, a schematic diagram of different multi-media sources is illustrated. More specifically, FIG. 1 illustrates video 10, printed handout material 11, and graphical material, such as slides, 12. Each different multi-media source 10–12 is associated with one or more databases 13. Each of these media modes 10–12 can be used as cues to perform a search of the multimedia content and produce an index for any of the media modes 10–12. For example, the multimedia content can be searched for places in the data where the index keywords were "heard" in the audio tract of the video 10. Alternately, using a slide pattern as a query, the invention can locate places in the video 10 where the slide 12 was being depicted in the scene captured in the video.

Each of the searches based on individual cues can return multiple locations in the media as matches which could possibly overlap in time. Combining these matches to develop a coherent response to a user's high-level semantic query or to automatically index any of the media sources, is an important and challenging problem. Performing multiple-mode queries is a very valuable tool for searching and browsing videos. Previous work in this area has concentrated on combining matches generated from textual sources, with current search engines exploiting one or more of the combining methods for text search such as Boolean AND/OR etc.

The invention provides a generic combining process for multimedia data that incorporates both relevance scores and co-occurrence of time intervals to automatically index the different media sources. Such a combination (e.g., relevance scores and co-occurrence) point to relevant semantic events in a lecture or course to identifying times when an index topic was discussed. For example, it can be reasonably concluded that places in the video in which a speaker put up a slide representing the index topic (seen, say, as a match for the slide pattern in the video tract) and also talks about it (heard, say, using words relating to the topic in the audio tract). Similarly, such co-occurrance events are more relevant to a topic or a common thread of discussion than video segments, in which an index topic was mentioned but not reinforced with a visual slide, or segments in which a slide was put up but never talked about.

FIG. 2 is a schematic diagram illustrating the topical content within different cues, such as the handout material 11, video 10, and slide 12 as they are used within a presentation made during a certain period of time covered by the time line 216. For example, the situation illustrated in FIG. 2 is a presentation where a speaker discussed topics A, B and C. The speaker was video recorded during the presentation. Further, the speaker presented three different slides 209, 210, 212, each relating to a different topic and the speaker handed out some material. This example is extremely simplified (when compared to the actual ability of the invention to create an index) to aid in the reader's understanding of the basic operation of the invention.

During the presentation illustrated in FIG. 2, the handout material 11 briefly summarized topics A, B and C (200) and then thoroughly discussed topics A, B, and C, in order, in items 201–203. In one embodiment, the invention allocates the written handout material along the time line 216. The invention can assign the written text to various time periods (e.g., T1–T5) depending upon a logical nexus with the presentation. In the example shown in FIG. 2, the handout material is divided along the timeline 216 according to the approximate length of each section within the handout material. Therefore, as shown in FIG. 2, each topic 201–203 was approximately the same number of pages in length and was allocated an approximately equal time slot along time line 216. However, the invention is not limited to an approximation related to the length of the topic. Instead, the information from the video discussion 10 can be correlated such that the handout material 11 is allocated to time periods along the time line 216 which follow closely with the speaker's discussion.

In the illustration shown in FIG. 2, the audio portion of the discussion is converted to text (either manually or using a voice recognition software program). As shown in FIG. 2, at the beginning of the presentation, the speaker discussed an overview of all three topics A, B, and C in item 204. Toward the end of the overview of all the topics, the speaker presented a slide on topic A (209). The timing of when the Speaker presented the slides can be automatically or manually associated with a specific time period by viewing the video 10.

Toward the end of the discussion of topic A (205), the speaker removed the first slide and displayed a slide regarding topic B (210). The speaker's discussion with respect to topic B (206) was relatively short and the speaker returned to topic A (207) and even briefly redisplayed the slide relating to topic A (211). Then, the speaker concluded with a brief discussion of topic C (208) during which time the speaker displayed a slide of topic C (212).

As mentioned above, the invention automatically indexes the information contained within one media source, based upon keywords from a different media source. Therefore, using the previous example of indexing a video recording using keywords from the presentation foils, the invention searches the audio portion of the video to locate matching keywords and also searches the video portion for occurrances of when the foils appeared in the video.

However, the invention is not limited to simply indexing a video based upon foils which appear in that video. Instead, with the invention, any media source can be used by the invention to index any other media source. Therefore, index keywords could be derived from the text database 13 and used to index the slides 12. Similarly, the audio portion of the video 10 could be used to create an index for the handout material 11. Essentially, the invention is useful for automatically creating indexes for any media mode based upon any other media mode. However, to most clearly illustrate the salient features of the invention, the following disclosure will primarily center upon indexing a videotaped lecture based upon index keywords derived from captions contained within foils.

The ability to develop keywords from text is a well-developed art field. Therefore, there are a number of systems available to those of ordinary skill in the art that can be used to automatically identify the keywords upon which the index will be based. A detailed description of such systems is omitted here so as not to unnecessarily obscure the invention.

In the example discussed above, one such conventional system could base the keyword selection upon the frequency with which the words occur in the foil captions. In a very simplified system, a predetermined number (e.g., 10) of the most frequent words could comprise the keywords. However, as mentioned above, much more elaborate keyword detection systems are available and could readily be used with the invention.

The invention not only searches the audio portion of the video for index keyword matches, but also searches for occurrences when different foils appear in the video. The recognition of the slides within videos has conventionally been a difficult and error-prone process. The invention performs such matching by, first, generating a representation of the video stream as a set of keyframes. Next, in one embodiment, the invention identifies likely matches of electronic slide images and keyframes by color-matching the electronic slide and keyframe images. The invention extracts the geometric features of slide images and keyframe images. Lastly, the invention matches the keyframe images and slide images.

Thus, the invention matches slides supplied in electronic or other form, to their appearance in a video stream. This invention allows indexing for such events through natural language queries. The invention makes no assumptions on camera geometry. As a result, the invention is successful even when the slides appearing in video stream are partially occluded; color variations exist; and/or the content of slides is very similar. The invention also does not make assumption of presentation order in slides and can recognize them in any arbitrary order including recognizing their multiple occurrences in the video stream.

The invention takes, as input, a set of slides that were created in electronic form (using any conventional presentation program such as Powerpoint, Freelance Graphics, etc.) or color or black and white images of slides; and a video stream, and outputs the set of frames in the video stream along with the position in the frame where one of the electronic slides or images on the electronic slides are depicted.

As a preliminary step, the invention prepares the slides and video stream for matching. The invention generates slide images from the electronic slides. This can be done by extracting images from any conventional graphic presentation program using a method such as the one described by Niblack [Niblack, "Slide finder . . . ", in Proc. IEEE Workshop on Content-based Access of Image and Video Libraries, 1999, incorporated herein by reference]. The invention generates a set of keyframes from the video stream by processing the video stream to detect scene changes, cuts and different camera shots. The invention then separates the video stream into keyframes.

In other words, each time the scene changes in the video stream, the invention creates a still image of that portion of the video stream. In doing so, the invention divides the video stream into individual still images. This method affectively summarizes the video stream with a limited set of keyframes.

Typically, a video stream will concentrate upon a specific feature for a period of time, after which a different feature becomes the subject of concentration. Thus, the invention creates a keyframe (or still image) of each feature which was the primary subject at some point during the video stream. As discussed below, the invention reviews each keyframe to determine whether any of the slide images appear within any portion of the key frame.

Next, the invention performs a first comparison of the slides and keyframes. In one embodiment, the invention compares the background color of a given slide image to the keyframes and identifies regions of the keyframe in which the slide image background color was detected. In this embodiment, and the following processes (such as matching geometric features) are only performed on regions of the keyframes which have a background color corresponding to the background color of the slide image. This feature of the invention substantially increases the accuracy and speed of the inventive process by limiting the regions of the keyframes which are analyzed. However, in other embodiments, the invention can omit the process of matching background color if, for example, the user decides that a more thorough review of all aspects of the keyframes is more important than increasing the processing speed, or if it is determined that there is a poor color match between the video stream and the slides.

The invention also identifies geometric features of each slide image and the images contained in the identified regions of the keyframes. More specifically, the invention concentrates upon the intensity components of the images (e.g., by converting the images into gray images and retaining only the intensity component of the images). Then, the invention extracts edges from the intensity components. Edges generally occur where there is a sharp change in intensity.

Figure 7:
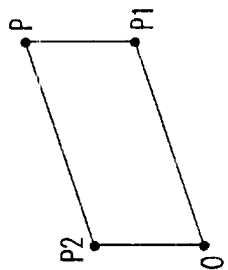
FIG. 7 is a schematic diagram illustrating an affine coordinate system.

The invention can then create line patterns (or "curves") by connecting the edges. Also, the invention identifies corner features, by locating places on the curves that have sharp changes in curvature. The corners serve as the basis features from which the geometric features for recognition are derived. A set of three such features forms a basis triple or an object-centered coordinate system in which positions of all other features can be expressed as affine coordinates as shown in FIG. 7. FIG. 7 shows affine coordinate of P with respect to (O,P1,P2).

Figure 8:
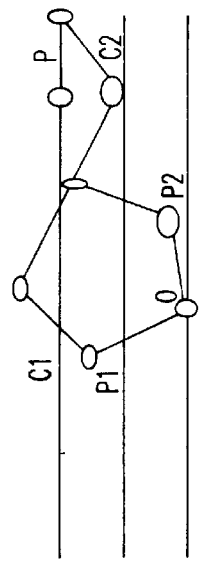
FIG. 8 is a schematic diagram illustrating curve-groups of basis triples.

The affine coordinates serve as the basis geometric features to characterize slides as well as keyframe images. The advantage of using affine coordinates as geometric features is that they are affine-invariant. That is, even when the slide appears in the keyframe in a skewed, rotated or scaled form, its geometric features with respect to corresponding basis triples will remain the same, leading to robust recognition. To restrict the number of basis triples and affine coordinates to a reasonable number, groups of curves are formed from the initial edge map using a suitable grouping constraint such as intersection, parallelism, etc. Then triplets of consecutive corners on single curves in curve-groups are chosen as basis triples. This ensures that there is only a linear number of basis triples as against the cubic number of basis triples that would exist otherwise. Next, the invention computes the affine coordinates of all corners on all curves in curve-groups with respect to the basis triples. The curve-group number of each corner is associated with the affine coordinate to serve as a geometric region identity for the affine coordinate feature which will be useful during the matching of slides to their appearance in keyframes. The choice of features to form basis triples and affine coordinates is illustrated in FIG. 8. FIG. 8 shows two curves (C1, C2) in a sample curve group. Note that the basis triple (O,P1,P2) is selected from consecutive features along the curve C1. The affine coordinates of points such as P on curve C2 are computed with respect to the basis triple (O,P1,P2) in C1.

Next, the invention arranges the slide image affine coordinates in a manner that permits a comparison between the slide image affine coordinates and the keyframe image affine coordinates. The invention places the slide image affine coordinates in a balanced binary search tree (called a location hash tree) where each node in the tree includes the background color and an index of the affine coordinates e.g., (I1, I2), (Bi, Ij). Bi is a basis triple that gave rise to the affine coordinates represented by the index (I1, I2). Here Ij is the slide image from which the basis triple arises. This relies on the affine-invariant properties of the affine coordinates mentioned earlier. That is, the keyframe region showing a given slide will have the same set of affine coordinates for the corresponding visible features with respect to a corresponding basis triple. However, due to noise and occlusions, a corresponding basis triple may often be missing. To account for this, the scheme computes the affine coordinates of the slide with respect to more than one basis triples before storing them in the index structure.

The invention indexes the location hash tree using the keyframe image basis triples. As a result of the index, the invention creates a histogram of slide image basis triples hit, and a histogram of the corresponding slide images hit. Each keyframe is paired with the slide image with the most hits. The slide which contains the most hits for a given keyframe is identified as corresponding to the given keyframe.

In addition, not every keyframe may contain a slide. Therefore, the invention also includes a feature which monitors the minimum threshold of basis triple matches before a keyframe is considered to correspond to any of the slides. This minimum threshold can be varied by the user depending upon the accuracy required and the quality of the video image.

Figure 3:
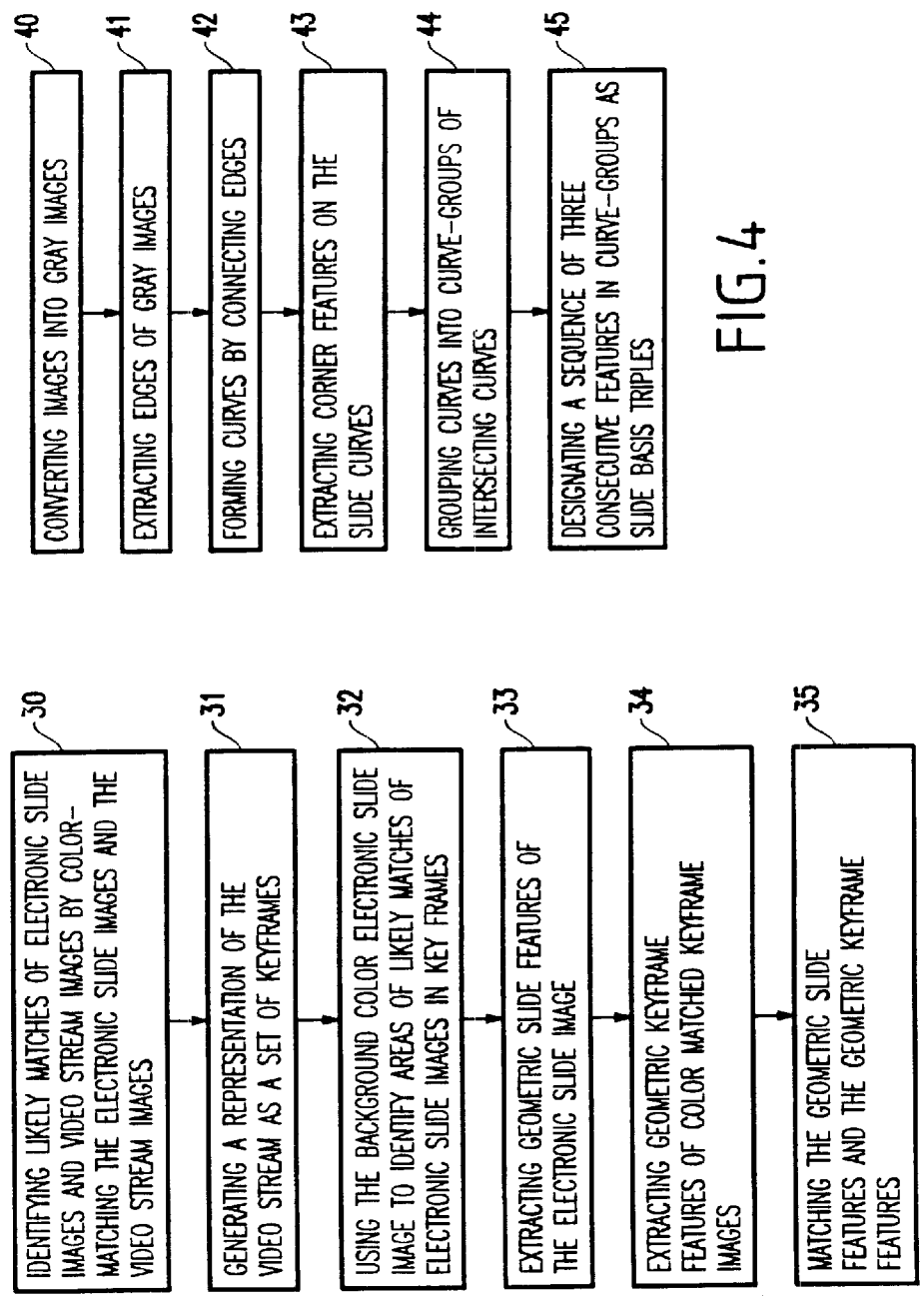
FIG. 3 is a flow chart depicted the overall steps of the matching electronic slide images and corresponding keyframe in a video stream.

FIG. 3 is a schematic diagram illustrating, in flowchart form, how the invention matches the keyframes to foils. As shown in FIG. 3, the invention identifies likely matches of electronic slide images and video stream images by detecting differences in video stream images using a simple color histogram, 30; generating a representation of the video stream as a set of keyframes, 31; using the background color electronic slide image to identify areas of likely matches of electronic slide images in key frames, 32; extracting geometric slide features of the electronic slide image, 33; extracting geometric keyframe features of color matched keyframe images, 34; and, matching the geometric slide features and the geometric keyframe features, 35.

FIG. 4 illustrates, again using a flowchart format, how the invention extracts geometric slide features. The invention first converts images into gray images, 40; extracts edges of gray images, 41; forms curves by connecting edges, 42; extracts corner features on the slide curves, 43; groups curves into curve-groups of intersecting curves, 44; and designates a sequence of three consecutive features in curve-groups as slide basis triples, 45.

Figure 5:
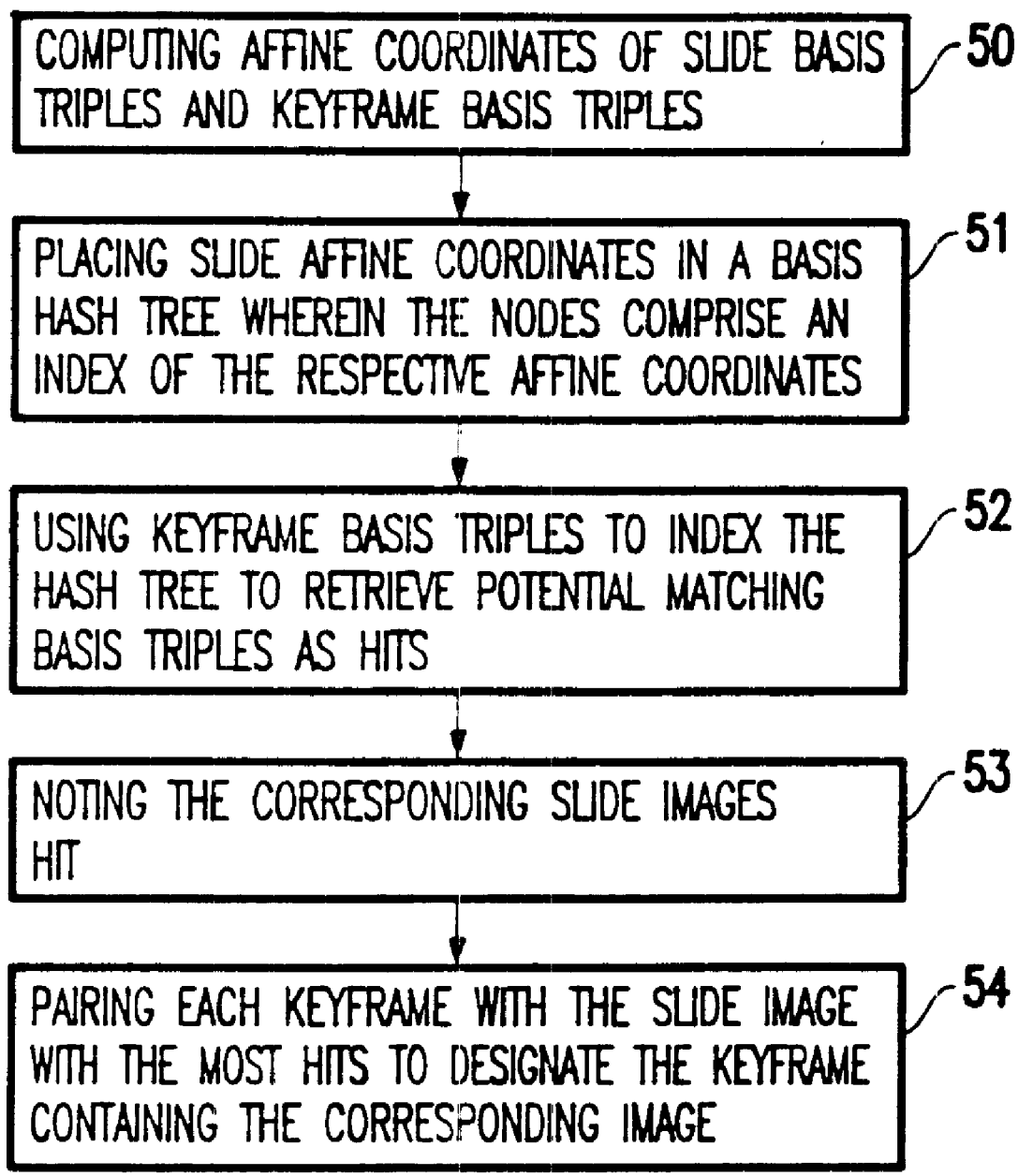
FIG. 5 is a flow chart of the steps involved in matching the geometric slide features and the geometric keyframe features.

FIG. 5 illustrates a further aspect of the invention in flowchart form. The invention computes affine coordinates of slide basis triples and keyframe basis triples, 50, places slide affine coordinates in a basis hash tree wherein the nodes comprise an index of the respective affine coordinates, 51, uses keyframe basis triples to index the hash tree to retrieve potential matching basis triples as hits, 52, notes the corresponding slide images hit, 53, and pairs each keyframe with the slide image with the most hits to designate the keyframe containing the corresponding image, 54. Therefore, the invention automatically at ratifies the locations in the video where different foils appear.

The use of a limited number of basis triples and affine coordinates together with the manner of computing affine coordinates across curve-groups greatly reduces the time required to perform the search and the amount of data that is generated and analyzed. The invention also optionally reduces the time required time to perform the search and the amount of data analyzed by first comparing the background colors of the keyframes and the slide image to detect potential slide image-containing regions in the keyframes. This allows the invention to isolate the potential slide image containing regions on the keyframes and analyze only the images in these regions rather than the entire key frame.

The use of affine coordinates allows definition of the images in relation to the image itself, rather than a set of Cartesian coordinates or points on the slide or to keyframe. As a result, the invention permits searching for and recognizing an image at any location on the slide or key frame. The invention also reduces the potential for missing a partially occluded image on a keyframe. The feature extraction portion of the invention includes a built-in redundancy in the location hash tree.

As discussed above, the invention automatically generates keywords form foils and searches text (e.g., the audio portion of the video, or the handout material) for the occurrence of keywords. In addition, the invention automatically identifies points in the video where the foils appear.

Next, the invention combines this information to automatically produce an index. Combining results of matches to multiple index keyword queries to generate an overall index is a challenging problem. Simple solutions such as ranking matches based on their individual cue scores are not sufficient as they cannot take into account the co-occurrence of matches, i.e., the fact that two or more of these matches occur in the same time interval.

Not all ways of taking the match co-occurrence into account are helpful either. For example, assigning a fixed score to the fact that there is an overlap is not necessarily helpful since this would weigh heavily overlapping segments the same as segments with small time overlap. Assigning a score to the extent of overlap and combining this with the individual scores is also not enough since the duration over which such overlaps occur could potentially span the entire video returning the entire video as a match and causing a loss in precision.

The invention combines multi-modal searches of multi-media data by exploiting the time overlap or co-occurrence of event matches in addition to their relevance scores in a new way. Specifically, the invention proceeds by dividing the overlapping time intervals into groups and uses the relevance scores of individual matches within the groups and their extent of overlap to produce an overall score. Each match from an individual cue can be denoted by $\lfloor L_j(C_i), H_j(C_i), F_j(C_i) \rfloor$ where $\lfloor L_j, (C_i), H_j, (C_i) \rfloor$ are the lower and upper end points of the time interval of the jth match using the ith modal cue for query, and $\lfloor F_j, (c_i) \rfloor$ is the score of the jth match in the ith cue.

The invention forms a function of time given by $$T(t) = \Sigma F_j(C_i) L_j(C_i) \leq t \leq H_j(C_i).$$

This function is 0 at times where there are no matches due to any cue. This forms a cumulative distribution of the individual match scores along the time axis.

The invention then takes the derivative of the above function $\partial T(t)/\partial t$. Then, the invention notes the time period or the cycle of the derivative by noting three consecutive zero crossings of the derivative curve (e.g., the beginning of the time period when the derivative bell-shaped curve goes from negative to positive, the maximum of the derivative curve where the curve changes from positive to negative, and the end of the time period when the derivative curve again changes from negative to positive). For the special cases where the profile of the cumulative distribution has less than three consecutive zero crossings, the time period between two consecutive zero crossings can be taken.

Figure 9:
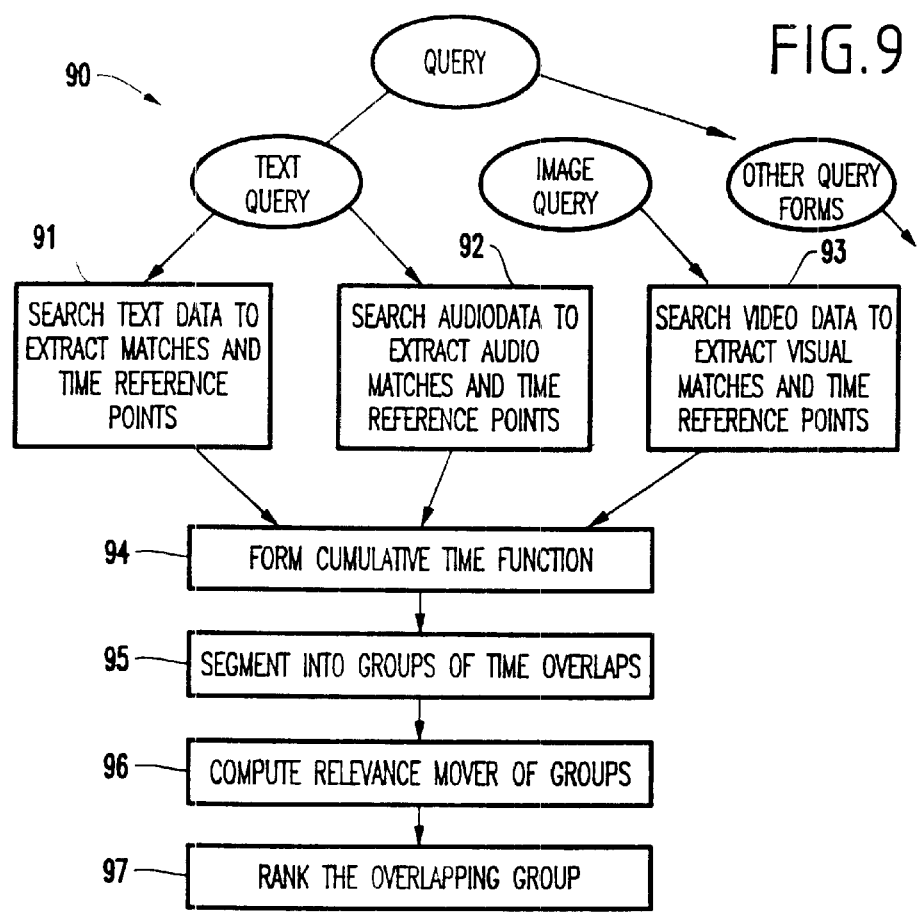
FIG. 9 is a flowchart embodiment of the invention.

FIG. 9 is a flowchart illustrating the inventive method for searching for index terms in multi-media including audio, video, graphic display, and written data. Item 90 illustrates processing the multi-media data to extract textual, audio and video representations. Item 91 illustrates the various query modes such as text and image that can be used to search the multimedia data. The text query can be used to search the text data to extract relevant matches and their time reference points. In addition, the text query can be used to search the text-converted audio data to extract relevant matches in the audio tract and their time reference points (item 92). Finally, the image query can be used to find visual matches to the query in the video tract and relevant matches are returned along with their time reference points.

Depending on the visual query, a number of different schemes of object detection and recognition in the video are admitted under this embodiment (item 93). The time reference points of all the matches are combined into a common time line and their cumulative distribution is derived as explained earlier (item 94). This distribution is segmented into groups of time overlaps as also explained earlier (item 95). The relevance scores of the individual time groups are computed as a linear combination of the fraction of overlap and the individual relevance matches of the cues (item 96). These groups are then ranked to list the most relevant matches to a query based on multimodal search and its combination (item 97).

Figure 10:
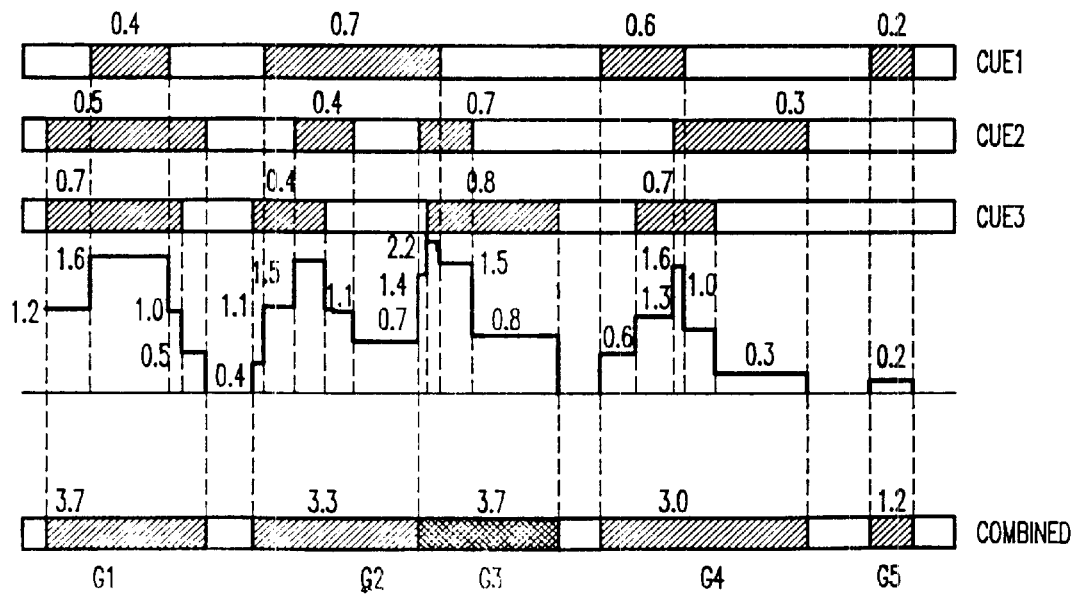
FIG. 10 is a timeline of cue events.

FIG. 10 shows such an example of a cumulative distribution formed from combining multi-modal searches. Here the individual scores of relevance of matches in individual cues are marked by the values on top of the bars. Each of the cues represents matches of one media type with another index search feature. For example, one can see that there are 4 matches to the index search feature using cue 1. Therefore, cue 1 could represent the match of an index keyword (from a foil caption) with words in the audio portion of the video. Similarly, cue 2 could represent the occurrence of a foil (from which the index keyword was taken) in the video. Cue 3 could represent another media type match or the appearance in the video of a different foil having the same matching keyword.

The matching time durations and locations are as marked by the dark rectangles with the lighter larger rectangle representing the entire time line of the data (e.g., total video duration). The cumulative distribution obtained by combining the relevance scores is shown in row 4 of FIG. 10. Notice the growing and shrinking of overlaps as seen by the rise and fall of the waveform.

The invention forms time interval groups between these triplets of adjacent zero crossings. The above process divides the time interval of matches into groups forming clusters that represent places where evidence for matches to one or more query types was found. The three consecutive zero crossings are based on the rationale that overlapping time intervals go through a pattern of overlapping cycles in which the overlap of interval grows and gradually shrinks. It can be seen in FIG. 10 that there are five distinct time interval groups that can be formed (e.g., G1–G5). Each such segment is assigned an overall score as follows for each match interval $[L_j(C_i), H_j(C_i), F_j(C_i)]$ belonging to group interval $G_k$, let $O_{jk}(C_i)$ be the fraction of overlap of the match interval with the group interval. Then the individual group score $F_k(G_k)$ is calculated as:

$$F_k(G_k) = \Sigma(F_j(C_i) + O_{jk}(C_i))$$

Lastly, the above scores are normalized to lie between 0 and 1 using the maximum value of $F_k(G_k)$ and are ranked in descending order to reflect the combined score. The last row in FIG. 10 illustrates the overall score assigned to the time interval groups using the above formula. It can then be inferred that the most relevant segments to the query are groups G1 and G3. Notice also, that these groups are not necessarily those with the largest amount of overlap. Such an interval is designated by G4 which is not considered as significant since its constituent relevance scores of matches is lower in general to those in G1 and G3.

Thus, the invention groups the time intervals between three consecutive zero crossings, and combines individual scores as a linear combination of the individual scores with their overlaps to produce superior results when compared to conventional query programs. Finally, the notion of time co-occurrence of events combined with multiple match results produces unique advantages for the invention.

Existing methods of combining search results have been primarily targeted towards text searches of textual documents with Boolean and other relevance-scoping searches combinations now possible. The search of multimedia data based on visual, text and audio query types and their combination of results that take into account their time co-occurrence have not been considered conventionally.

Therefore, as shown above, the invention utilizes more than a search of the text within the database 13 when preparing an index. The invention increases the accuracy of the index search results by determining the time period when the various modes of the multi-media sources were being utilized simultaneously to explain a given idea or subject. The invention realizes that the most relevant portion of the presentation for a given topic would, most likely, be at the point during the presentation when all resources were focused on that given topic. Therefore, the invention utilizes the timing as well as the topical relevance to increase the accuracy of the index.

Figure 6:
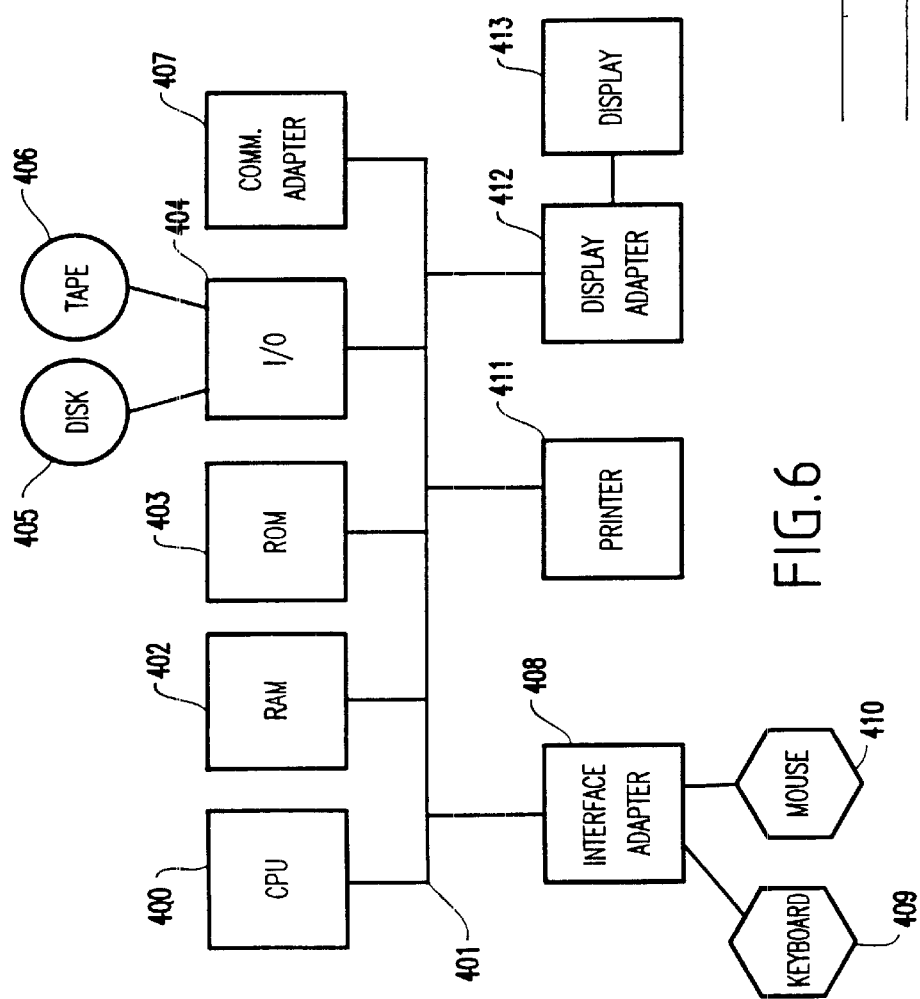
FIG. 6 is a schematic diagram of a hardware embodiment of the invention.

The invention can be embodied in any number of different types of systems and executed in any number of different ways, as would be known by one ordinarily skilled in the art, given this disclosure. For example, as illustrated in FIG. 6, a typical hardware configuration of an information handling/computer system in accordance with the invention preferably has at least one processor or central processing unit (CPU) 400. For example, the central processing unit 400 could include various image/texture processing units, mapping units, weighting units, classification units, clustering units, filters, adders, subtractors, comparators, etc. Alternatively, as would be known by one ordinarily skilled in the art given this disclosure, multiple specialized CPU=s (or other similar individual functional units) could perform the same processing, mapping, weighting, classifying, clustering, filtering, adding, subtracting, comparing, etc.

The CPU 400 is interconnected via a system bus 401 to a random access memory (RAM) 402, read-only memory (ROM) 403, input/output (I/O) adapter 404 (for connecting peripheral devices such as disk units 405 and tape drives 406 to the bus 401), communication adapter 407 (for connecting an information handling system to a data processing network) user interface adapter 408 (for connecting peripherals 409–410 such as a keyboard, mouse, imager, microphone, speaker and/or other interface device to the bus 401), a printer 411, and display adapter 412 (for connecting the bus 401 to a display device 413). The invention could be implemented using the structure shown in FIG. 6 by including the inventive method, described above, within a computer program stored on the storage device 405. Such a computer program would act on an image supplied through the interface units 409–410 or through the network connection 407. The system would then automatically segment the textures and output the same on the display 413, through the printer 411 or back to the network 407.

By taking into account the time co-occurrence of matches in addition to their individual relevance scores, this methods provides a higher degree of robustness to errors in producing an index. As is conventionally believed, manual visual and audio searches are notoriously lacking in precision. In such cases, the combining of evidence can tremendously enhance the robustness of the index produced.

Thus, the invention automatically develops an index for any type of media. The invention automatically produces topical index search items. In the above example, the topical search items were the most frequent terms occurring in the captions of foils. Then, the invention searches different media types (e.g., video and audio) to produce matches. The matches are then observed all along a time line to determine the co-occurrence of matches. The co-occurrence information is combined with relevance information to accurately index the media type in question. Since this process is fully automated, it is very efficient and does not require subjective judgment of an operator.

Further, the accuracy of the index produced with the invention is a very high for a number of reasons. In particular, by looking at multiple media mode searches (e.g., audio and video), the likelihood of correctly identifying the occurrence of the index search item dramatically increases. Conventional efforts which observe only a single media type produce false positive and false negative results much more easily. To the contrary, the different media-type searches utilized by the invention provide a cross-check to eliminate false positive and false negative results. In addition, the invention goes beyond a simple identification of a co-occurrence of a search term by including relevance information to more precisely evaluate which co-occurrence has the highest probability of correctly identifying material relating to the index search item.

While the invention has been described in terms of preferred embodiments, those skilled in the art will recognize that the invention can be practiced with modification within the spirit and scope of the appended claims.

What is claimed is:

1. A computer implemented method of indexing multi-media data comprising:
   deriving keywords from a first media type;
   matching said keywords to a second media type;
   identifying an appearance of said first media type in said second media type; and
   calculating a co-occurrence of said keywords and said appearance of said first media type in said second media type.

2. The method in claim 1, further comprising producing an index of said second media type based on said co-occurrence.

3. The method in claim 1, wherein said identifying comprises:
   generating keyframes from said second media type;
   extracting geometric keyframe features from said keyframes and geometric slide features from said first media type; and
   matching said geometric slide features and said geometric keyframe features.

4. The method in claim 3, further comprising identifying background matching regions in said keyframes having colors matching colors of backgrounds in said second media type.

5. The method in claim 4, wherein said extracting of said geometric keyframe features is performed only in said background matching regions.

6. The method in claim 3, wherein said matching identifies which portion of said first media type has a highest number of geometric slide features matching geometric keyframe features in a keyframe of said keyframes.

7. The method in claim 3, wherein said extracting includes:
   identifying changes in image intensity as edges;
   forming curves connecting said edges;
   identifying corners where said curves change direction;
   grouping said curves into curve-groups; and designating a sequence of three consecutive features in each of said curve-groups as basis triples.

8. The method in claim 7, wherein said matching comprises:
   computing coordinates of said basis triples;
   identifying which portion of said first media type has a highest number of basis triples matching basis triples in a keyframe of said keyframes.

9. The method in claim 3, wherein said generating of said keyframes comprises:
   dividing said second media type into portions based upon scene changes; and
   selecting one frame from each portion of said second media type as a keyframe.

10. The method in claim 1, wherein said calculating comprises:
    processing said multi-media data to extract relevance scores and time reference points of matches to individual media modes;
    identifying overlapping time periods of matching keywords and said appearance of said first media type in said second media type; and
    ranking a relevance of said overlapping time periods.

11. The method in claim 10, wherein said ranking includes finding an overlapping time period having a highest relevance score.

12. The method in claim 10, wherein said ranking includes segmenting said overlapping time period to identify beginning and ending events.

13. The method in claim 10, wherein said ranking includes finding a largest number of different modes of overlap.

14. The method in claim 10, wherein said modes comprise two or more of audio, video, text, and graphic display.

15. A computer implemented method of indexing multi-media data comprising:
    deriving keywords from slides;
    matching said keywords to an audio portion of video data;
    identifying an appearance of said slides in a video portion of said video data; and
    calculating a co-occurrence of said keywords and said appearance of said slides in said video data.

16. The method in claim 15, further comprising producing an index of said video data based on said co-occurrence.

17. The method in claim 15, wherein said identifying comprises:
    generating keyframes from said video portion;
    extracting geometric keyframe features from said keyframes and geometric slide features from said slides; and
    matching said geometric slide features and said geometric keyframe features.

18. The method in claim 17, further comprising identifying background matching regions in said keyframes having colors matching colors of backgrounds in said slides.

19. The method in claim 18, wherein said extracting of said geometric keyframe features is performed only in said background matching regions.

20. The method in claim 17, wherein said matching identifies which slide of said slides has a highest number of geometric slide features matching geometric keyframe features in a keyframe of said keyframes.

21. The method in claim 17, wherein said extracting includes:
    identifying changes in image intensity as edges;
    forming curves connecting said edges;
    identifying corners where said curves change direction;
    grouping said curves into curve-groups; and
    designating a sequence of three consecutive features in each of said curve-groups as basis triples.

22. The method in claim 21, wherein said matching comprises:

computing coordinates of said basis triples;

identifying which slide of said slides has a highest number of basis triples matching basis triples in a key frame of said keyframes.

23. The method in claim 17, wherein said generating of said keyframes comprises:

dividing said video data into portions based upon scene changes; and selecting one frame from each portion of said video as a keyframe.

24. The method in claim 15, wherein said calculating comprises:

processing said video data to extract relevance scores and time reference points of matching keywords and said appearance of said slide in said video portion;

identifying overlapping time periods of matching keywords and said appearance of said slides in said video portion; and ranking a relevance of said overlapping time periods.

25. The method in claim 24, wherein said ranking includes finding an overlapping time period having a highest relevance score.

26. The method in claim 24, wherein said ranking includes segmenting said overlapping time period to identify beginning and ending events.

27. The method in claim 24, wherein said ranking includes finding a largest number of different modes of overlap.

28. The method in claim 24, wherein said modes comprise two or more of audio, video, text, and graphic display.

* * * * *